(12) United States Patent
Sano et al.

(10) Patent No.: US 9,375,792 B2
(45) Date of Patent: *Jun. 28, 2016

(54) METHODS OF MANUFACTURING SHEET FILM FORMING ROLLS

(71) Applicant: Toshiba Kikai Kabushiki Kaisha, Chiyoda-ku, Tokyo (JP)

(72) Inventors: Takayoshi Sano, Fuji (JP); Tadamasa Furuya, Suntou-Gun (JP)

(73) Assignee: TOSHIBA KIKAI KABUSHIKI KAISHA, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/607,927

(22) Filed: Jan. 28, 2015

(65) Prior Publication Data
US 2015/0202725 A1    Jul. 23, 2015

Related U.S. Application Data

(62) Division of application No. 13/321,101, filed as application No. PCT/JP2010/058004 on May 12, 2010, now Pat. No. 8,973,304.

(30) Foreign Application Priority Data

May 19, 2009 (JP) ................... 2009-121141

(51) Int. Cl.
*B23B 31/40* (2006.01)
*B23Q 3/06* (2006.01)
*B23B 31/42* (2006.01)

(52) U.S. Cl.
CPC ............. *B23B 31/4093* (2013.01); *B23B 31/40* (2013.01); *B23B 31/42* (2013.01);
(Continued)

(58) Field of Classification Search
CPC .... B23K 37/06; B23K 37/0408; F16C 13/00; B21B 27/00; B21B 27/06; B21B 27/08; B21B 27/10; B21B 27/021; B21B 27/106; B23B 31/40; B23B 31/42; B23B 2215/64; B23B 2260/124; B23B 2270/06; B23B 2260/016; B23Q 3/064; Y10T 29/53961; Y10T 29/49544; Y10T 29/4956; Y10T 29/49996; Y10T 29/49998; Y10T 29/49565; Y10T 29/49995

See application file for complete search history.

(56) References Cited

U.S. PATENT DOCUMENTS 3,995,967 A * 12/1976 Haller ............................ 403/370
4,768,791 A *  9/1988 Whiting et al. .............. 279/2.02
(Continued)

FOREIGN PATENT DOCUMENTS

CN      8720274      11/1988
JP      64-080515    3/1989
(Continued)

OTHER PUBLICATIONS

English Machine Translation of JP 2006026831 A (Feb. 2, 2006).*
(Continued)

*Primary Examiner* — Sarang Afzali
(74) *Attorney, Agent, or Firm* — DLA Piper LLP US

(57) ABSTRACT

A sheet film forming roll is manufactured by processing a thin cylindrical work used as an external cylinder of the sheet film forming roll by holding the thin cylindrical work using a holding jig and machining an outer peripheral surface of the thin cylindrical work. The holding jig includes a holding member, a diameter changing unit, and a pair of circular side plates. The holding member is made of a metal and has a cylindrical shape and an elastically expandable or contractible diameter. An outside diameter of the holding member is held smaller than an inside diameter of the thin cylindrical work for insertion of the holding member into an inner periphery of the thin cylindrical work and expanded after insertion of the holding member into the inner periphery of the thin cylindrical work to hold the thin cylindrical work from an inner peripheral side of the thin cylindrical work.

6 Claims, 7 Drawing Sheets

(52) U.S. Cl.
CPC ............ *B23Q 3/064* (2013.01); *B23B 2215/64* (2013.01); *B23B 2260/016* (2013.01); *B23B 2260/124* (2013.01); *B23B 2270/06* (2013.01); *Y10T 29/4956* (2015.01); *Y10T 29/49544* (2015.01); *Y10T 29/49998* (2015.01); *Y10T 29/53961* (2015.01); *Y10T 279/1016* (2015.01); *Y10T 279/1066* (2015.01); *Y10T 279/1087* (2015.01)

(56) References Cited

U.S. PATENT DOCUMENTS

| | | | | |
|---|---|---|---|---|
| 5,397,135 | A | * | 3/1995 | Smith .......................... 279/2.04 |
| 5,522,785 | A | | 6/1996 | Kedl |
| 6,110,093 | A | * | 8/2000 | Slusarz ........................ 493/416 |
| 6,742,785 | B1 | * | 6/2004 | Weller ......................... 279/2.17 |
| 6,832,756 | B2 | * | 12/2004 | Palmer et al. ................ 269/48.1 |

FOREIGN PATENT DOCUMENTS

| | | | | |
|---|---|---|---|---|
| JP | 08-243815 | | 9/1996 | |
| JP | 11-235747 | | 8/1999 | |
| JP | 11235747 | A * | 8/1999 | ............. B29C 47/88 |
| JP | 11-333542 | | 12/1999 | |
| JP | 2001-322015 | | 11/2001 | |
| JP | 2006-026831 | | 2/2006 | |
| JP | 2006026831 | A * | 2/2006 | ............. B23B 31/40 |
| JP | 2007-083577 | | 4/2007 | |
| JP | 2008-213965 | | 8/2008 | |

OTHER PUBLICATIONS

English Machine Translation of JPH 11235747 A (Aug. 31, 1999).*
English Language Abstract of JP 2006-026831 published Feb. 2, 2006.
English Language Translation of JP 2006-026831 published Feb. 2, 2006.
English Language Abstract of JP 11-235747 published Aug. 31, 1999.
English Language Translation of JP 11-235747 published Aug. 31, 1999.
English Language Asbstract of JP 08-243815 published on Sep. 24, 1996.
English Language Translation of JP 08-243815 published on Sep. 24, 1996.
English Language Abstract of JP 2001-322015 published on Nov. 20, 2001.
English Language Translation of JP 2001-322015 published on Nov. 20, 2001.
English Language Abstract of JP 2007-083577 published on Apr. 5, 2007.
English Language Translation of JP 2007-083577 published on Apr. 5, 2007.
Taiwanese Office Action issued in TW 099115833 on Aug. 29, 2012.
English Language Translation of Taiwanese Office Action issued in TW 099115833 on Aug. 29, 2012.
English Language Abstract of JP 2008-213965 published on Sep. 18, 2008.
English Language Translation of JP 2008-213965 published on Sep. 18, 2008.
English Language Abstract of JP 11-333542 published on Dec. 7, 1999.
English Language Translation of JP 11-333542 published on Dec. 7, 1999.
English Language Abstract of JP 64-080515 published Mar. 27, 1989.
Japanese Office Action issued in JP 2009-121141 on Sep. 25, 2012.
English Language Translation of Japanese Office Action issued in JP 2009-121141 on Sep. 25, 2012.
Chinese Office Action issued Jan. 31, 2013 in CN 201080021731.4.
English Language Translation of Chinese Office Action issued Jan. 31, 2013 in CN 201080021731.4.
English Language Abstract of CN 87202741 published Jan. 20, 1988.
Korean Office Action issued in KR 10-2011-7027512 on Apr. 29, 2013.
English Language Translation of Korean Office Action issued in KR 10-2011-7027512 on Apr. 29, 2013.
Related U.S. Appl. No. 13/321,101.
Related U.S. Appl. No. 14/607,934.

* cited by examiner

METHODS OF MANUFACTURING SHEET FILM FORMING ROLLS

CROSS REFERENCE TO RELATED APPLICATIONS

This application is a Divisional of U.S. application Ser. No. 13/321,101 filed Nov. 17, 2011, now U.S. Pat. No. 8,973,304. U.S. application Ser. No. 13/321,101 is a U.S. National Stage Application of International Application No. PCT/JP2010/058004 filed May 12, 2010, which claims priority from Japanese Patent Application No. 2009-121141 filed May 19, 2009. The entirety of all the above-listed applications are incorporated herein by reference.

TECHNICAL FIELD

The present invention relates to a holding jig for a thin cylindrical work used for machining a thin cylindrical work, a method for processing the work using the holding jig, and a sheet film forming roll.

BACKGROUND ART

A forming roll of a double cylinder structure is known as one of forming rolls for forming plastic sheets, films and the like. As disclosed in Patent Literature 1, the forming roll of a double cylinder structure has a highly rigid metallic internal cylinder arranged inside and coaxially with a flexible thin metallic external cylinder with a space for circulating a coolant provided between the internal and the external cylinders.

Patent Literature 1 states that the very practical thickness of a thin cylinder body used as the thin metallic external cylinder of the forming roll of this type is within a range from a lower limit of 2 mm due to machining constraints, to an upper limit of 5 mm.

However, in recent years, there have been more strict demands that the thin cylindrical body be thinner and achieve higher processing accuracy in order to form more advanced plastic sheets and films. Thus, holding the thin cylindrical body in machining processing is required to fully respond to the demands.

As holding jigs for holding a thin cylindrical body of this type (hereinafter referred to as a "thin cylindrical work") in the machining processing, holding jigs described in Patent Literatures 2 and 3 have been known. In each of the holding jigs described in Patent Literatures 2 and 3, an elastic member made of a rubber or the like is provided between an outer periphery of a holding member inserted to an inner periphery of a work and the inner periphery of the work, and a force to hold the work is generated by compressing the elastic member in an axial direction and thereby expanding the elastic member in a radial direction.

In this case, the elastic member is made of a soft material such as rubber. When the material is used over the full length in the axial direction, a compressive force is not distributed to the entire elastic member even if such a force is applied from both ends of the elastic member. Therefore, the elastic members and spacers are alternately arranged.

CITATION LIST

Patent Literature

PLT 1: Japanese Unexamined Patent Application Publication No. Hei 11-235747

PLT 2: Japanese Unexamined Patent Application Publication No. Hei 8-243815

PLT 3: Japanese Unexamined Patent Application Publication No. 2001-322015

SUMMARY OF INVENTION

Technical Problem

However, the elastic member made of the soft material such as the rubber and interposed between the work and the holding member is likely to deform by a pressure in the processing. Thus, there is a problem that the strict processing requirements cannot be satisfied. Moreover, if the spacers and the elastic members are alternately arranged, positions to support the inner periphery of the work are discontinuous, so that the elastic members are more likely to deform by the pressure in the processing. Hence, there is a problem that the strict processing requirements cannot be sufficiently satisfied. Nowadays, in the case of processing a thin roll for extrusion, for example, an outer peripheral surface of the work needs to be finished in the micron order (for cylindricity) or in the submicron order (for surface roughness), and therefore there is a concern of a failure to maintain desired processing accuracy.

In view of the aforementioned circumstances, an object of the present invention is to provide a holding jig for a thin cylindrical work capable of reliably supporting a work entirely as a whole from an inner peripheral side, exerting such a strong holding force to withstand a processing pressure, resisting deformation even when a strong processing force is applied locally, and allowing machining at high accuracy (such as cutting the outer periphery, grinding the outer periphery or pattern forming), to provide a method for processing a thin cylindrical work using the holding jig, and to provide a sheet film forming roll using as an external cylinder a thin cylindrical work processed by the processing method.

Solution to Problem

To solve the above-mentioned problems, a first aspect of the present invention is a holding jig for a thin cylindrical work, the holding jig comprising: a holding member made of metal and having a cylindrical shape and an elastically expandable or contractible diameter, the holding member configured with an outside diameter of the holding member being held smaller than an inside diameter of the thin cylindrical work for insertion of the holding member into an inner periphery of the work and being expanded after insertion of the holding member into the inner periphery of the work to hold the work from an inner peripheral side of the work with an outer peripheral surface of the holding member in close contact with an entire inner peripheral surface of the work; and a diameter changing unit configured to apply at least one of an axial external force in a compressing direction and an axial external force in a tensile direction to both ends of the holding member to change the diameter of the holding member.

According to the first aspect, when the thin cylindrical work is held from the inner peripheral side with the metallic cylinder holding member, the work is held with the outer peripheral surface of the metallic cylinder holding member contacting substantially the entire inner peripheral surface of the work. Therefore, it is possible to support the work entirely as a whole from the inner peripheral surface side and to exert a strong holding force to withstand a processing pressure. Moreover, the work is hardly deformed when receiving a strong processing force locally unlike the case of holding the work by using a conventional elastic body made of a rubber or the like. Hence it is possible to perform machining at high accuracy and thereby to improve cylindricity and surface roughness of the work.

The outside diameter of the holding member may be smaller than the inside diameter of the work in a natural state where the axial external forces is not applied to the holding member, and the diameter changing unit may include a diameter expansion mechanism configured to apply the axial external force in the compressing direction to the both ends of the holding member to expand the diameter of the holding member after insertion of the holding member into the work.

According to this configuration, the outside diameter of the metallic cylinder holding member is formed slightly smaller than the inside diameter of the thin cylindrical work in a natural state where the axial external force is not applied. Hence it is possible to insert the metallic cylinder holding member to the inner periphery of the work while maintaining the natural state. Moreover, at an inserted stage, the axial external force in the compressing direction is applied to both ends of the metallic cylinder holding member by using the diameter expansion mechanism provided as the diameter changing unit so as to expand the diameter of the metallic cylinder holding member. Accordingly, it is possible to cause the outer peripheral surface of the metallic cylinder holding member to closely contact the inner peripheral surface of the thin cylindrical work and to stably hold the thin cylindrical work.

The outside diameter of the holding member may be larger than the inside diameter of the work in a natural state where the axial external forces is not applied to the holding member, and the diameter changing unit may include a diameter contraction mechanism configured to apply the axial external force in the tensile direction to the both ends of the holding member to contract the diameter of the holding member prior to insertion of the holding member into the work.

According to this configuration, the outside diameter of the metallic cylinder holding member is formed slightly larger than the inside diameter of the thin cylindrical work in the natural state where the axial external force is not applied. Hence it is possible to insert the metallic cylinder holding member to the inner periphery of the work firstly by applying the axial external force in the tensile direction to both ends of the metallic cylinder holding member so as to contract the diameter of the metallic cylinder holding member. Then, at an inserted stage, it is possible to restore (expand) the diameter of the metallic cylinder holding member to the diameter in a free state by removing the axial external force (the tensile force) applied from the diameter contraction mechanism provided as the diameter changing unit. Accordingly, it is possible to cause the outer peripheral surface of the metallic cylinder holding member to closely contact the inner peripheral surface of the thin cylindrical work and to stably hold the thin cylindrical work.

The outside diameter of the holding member may be different from the inside diameter of the work in a natural state where the axial external forces is not applied to the holding member, and the diameter changing unit may include: a diameter contraction mechanism configured to apply the axial external force in the tensile direction to the both ends of the holding member to contract the diameter of the holding member prior to insertion of the holding member into the work; and a diameter expansion mechanism configured to apply the axial external force in the compressing direction to the both ends of the holding member to expand the diameter of the holding member after insertion of the holding member into the work.

According to this configuration, it is possible to insert the metallic cylinder holding member to the inner periphery of the work firstly by applying the axial external force in the tensile direction to both ends of the metallic cylinder holding member by use of the diameter contraction mechanism provided as the diameter changing unit so as to contract the diameter of the metallic cylinder holding member. Then, at an inserted stage, the axial external force (the tensile force) applied from the diameter contraction mechanism is released and the axial external force in the compressing direction is applied to both ends of the metallic cylinder holding member by use of the diameter expansion mechanism provided as the diameter changing unit so as to expand the diameter of the metallic cylinder holding member. Accordingly, it is possible to cause the outer peripheral surface of the metallic cylinder holding member to closely contact the inner peripheral surface of the thin cylindrical work and to stably hold the thin cylindrical work.

The holding jig may further comprise a pair of circular side plates each having a shaft portion being coaxial with the holding member and located on an outer side surface of the circular side plate, wherein the pair of side plates has outer peripheral portions fixed to the both ends of the holding member respectively, the diameter changing unit is provided between the pair of side plates, and the diameter changing unit includes: rods provided between the pair of side plates; and a screw mechanism configured to apply any of a tensile force and a compressing force to each of the rods by rotation of a screw so as to apply any of the axial external force in the compressing direction and the axial external force in the tensile direction to the both ends of the holding member via the side plates by way of a reactive force of any of the tensile force and the compressing force.

According to this configuration, by applying either the tensile force or the compressive force to the rods by tightening the screws, it is possible to apply either the axial external force in the compressing direction or the axial external force in the tensile direction to both ends of the metallic cylinder holding member via the side plates, and thereby to hold the work from the inner peripheral side using the metallic cylinder holding member. Moreover, it is possible to subject the outer peripheral surface of the work to machining at high accuracy by holding the work as described above and rotating the work while supporting the shaft portions provided in the protruding manner on both of the side plates.

At least one of both outside regions of the holding member outside a work holding region located at a center portion of the holding member in an axial direction corresponding to a length of the work in the axial direction may have any of a tapered shape and a stepped shape having a smaller diameter than a diameter of the work holding region, and at least one of the side plates may be fixed to an end of a portion formed to have the smaller diameter than the diameter of the work holding region.

According to this configuration, the portion formed into the tapered shape or the stepped shape so as to have the smaller diameter than that of the work holding region is provided outside the work holding region. Hence it is possible to insert or detach the metallic cylinder holding member into and from the work easily.

A thickness of a peripheral wall of the work may be equal to or below 2 mm.

According to this configuration, by holding a work having a thinner peripheral wall (thickness) than that of the related art (a work having the thickness of the peripheral wall equal to or below 2 mm), it is possible to perform work processing previously difficult by using a conventional holding jig, and thereby to form advanced plastic sheets and films.

A second aspect of the present invention is a method for processing a thin cylindrical work, the method comprising: holding the thin cylindrical work using a holding jig for a thin cylindrical work, the holding jig including: a holding member made of metal and having a cylindrical shape and an elastically expandable or contractible diameter, the holding member configured with an outside diameter of the holding member being held smaller than an inside diameter of the thin cylindrical work for insertion of the holding member into an inner periphery of the work and being expanded after insertion of the holding member into the inner periphery of the work to hold the work from an inner peripheral side of the work with an outer peripheral surface of the holding member in close contact with an entire inner peripheral surface of the work; and a diameter changing unit configured to apply at least one of an axial external force in a compressing direction and an axial external force in a tensile direction to both ends of the holding member to change the diameter of the holding member; and machining an outer peripheral surface of the work being held.

According to the second aspect, it is possible to perform processing at high accuracy by machining the thin cylindrical work while holding the work with the holding jig of the first aspect.

A third aspect of the present invention is a sheet film forming roll comprising: a thin cylindrical work used as an external cylinder, the work processed by a method for processing a thin cylindrical work including holding the thin cylindrical work using a holding jig for a thin cylindrical work and machining an outer peripheral surface of the work being held, the holding jig including: a holding member made of metal and having a cylindrical shape and an elastically expandable or contractible diameter, the holding member configured with an outside diameter of the holding member being held smaller than an inside diameter of the thin cylindrical work for insertion of the holding member into an inner periphery of the work being expanded after insertion of the holding member into the inner periphery of the work to hold the work from an inner peripheral side of the work with an outer peripheral surface of the holding member in close contact with an entire inner peripheral surface of the work; and a diameter changing unit configured to apply at least one of an axial external force in a compressing direction and an axial external force in a tensile direction to both ends of the holding member to change the diameter of the holding member.

The sheet film forming roll may further comprise: an internal cylinder located inside the external cylinder and sharing a central axis with the external cylinder, wherein a heat medium flows between the external cylinder and the inner cylinder, and the thin cylindrical work used as the external cylinder has a peripheral wall having a thickness of 0.5 to 2 mm, and an outer peripheral surface having a maximum surface roughness equal to or below 1 µm.

The thin cylindrical work used as the external cylinder may be subjected to crowning.

The sheet film forming roll may further comprise: an internal cylinder located inside the external cylinder and sharing a central axis with the external cylinder, wherein a heat medium flows between the external cylinder and the inner cylinder, and the thin cylindrical work used as the external cylinder has a peripheral wall having a thickness of 0.5 to 2 mm, and an outer peripheral surface with a transcriptional pattern including fine irregularities.

The sheet film forming roll may further comprise: an internal cylinder located inside the external cylinder and sharing a central axis with the external cylinder, wherein a heat medium flows between the external cylinder and the inner cylinder, and the thin cylindrical work used as the external cylinder has a peripheral wall having a thickness of 0.5 to 2 mm, and an outer peripheral surface with a pearskin-like transcriptional pattern.

According to the third aspect, it is possible to manufacture highly accurate sheets and films because the accurately manufactured thin cylindrical work is used as the external cylinder.

Advantageous Effects of Invention

According to the present invention, it is possible to provide a holding jig for a thin cylindrical work capable of reliably supporting a work entirely as a while from an inner peripheral side, exerting a strong holding force to withstand a processing pressure, resisting deformation even when a strong processing force is applied locally, and allowing machining at high accuracy, to provide a method for processing a thin cylindrical work using the holding jig, and to provide a sheet film forming roll using a thin cylindrical work processed by the processing method as an external cylinder.

BRIEF DESCRIPTION OF DRAWINGS

FIG. 1(a) is a side sectional view. FIG. 1(b) is a diagram viewed along an arrow X in FIG. 1(a).

FIG. 2(a) is a view showing a state where the holding jig is about to be inserted to an inner periphery of a work. FIG. 2(b) is a view showing a state where the work is held with a diameter of a metallic cylinder holding member expanded by means of compression in an axial direction to both ends after the insertion.

FIG. 3(a) is a side sectional view. FIG. 3(b) is a diagram viewed along an arrow X in FIG. 3(a).

FIG. 4(a) is a view showing a state where the holding jig is about to be inserted to an inner periphery of a work while a diameter of a metallic cylinder holding member is contracted by means of tension applied in an axial direction to both ends. FIG. 4(b) is a view showing a state where the work is being held with the diameter of the metallic cylinder holding member restored (expanded) to an initial diameter after the insertion by releasing the tension in the axial direction to both ends.

FIG. 5(a) is a view showing a state where the holding jig is about to be inserted to an inner periphery of a work while a diameter of a metallic cylinder holding member is contracted by means of tension applied in an axial direction to both ends. FIG. 5(b) is a view showing a state where the work is being held with the diameter of the metallic cylinder holding member expanded by releasing the tension in the axial direction to both ends after the insertion and by applying compressive force in the axial direction to both ends.

FIG. 6(a) is a partial cross-sectional view showing an example of reducing a diameter by forming the end portion into a tapered shape. FIG. 6(b) is a partial cross-sectional view showing an example of reducing the diameter by forming the end portion into a stepped shape.

FIG. 7(a) is a partial cross-sectional view showing an example of establishing fixation by engaging an outer periphery of the side plate with an inner periphery of the end portion of the metallic cylinder holding member. FIG. 7(b) is a partial cross-sectional view showing an example of establishing fixation by forming a stepped portion on an outer peripheral portion of the side plate and engaging the stepped portion with the end portion of the metallic cylinder holding member. FIG. 7(c) is a partial cross-sectional view showing an example of establishing fixation by causing a side surface of the side plate and an end surface of the metallic cylinder holding member to abut each other.

DESCRIPTION OF EMBODIMENTS

Embodiments of the present invention will be described below with reference to the accompanying drawings.
(First Embodiment)

Figure 1A:
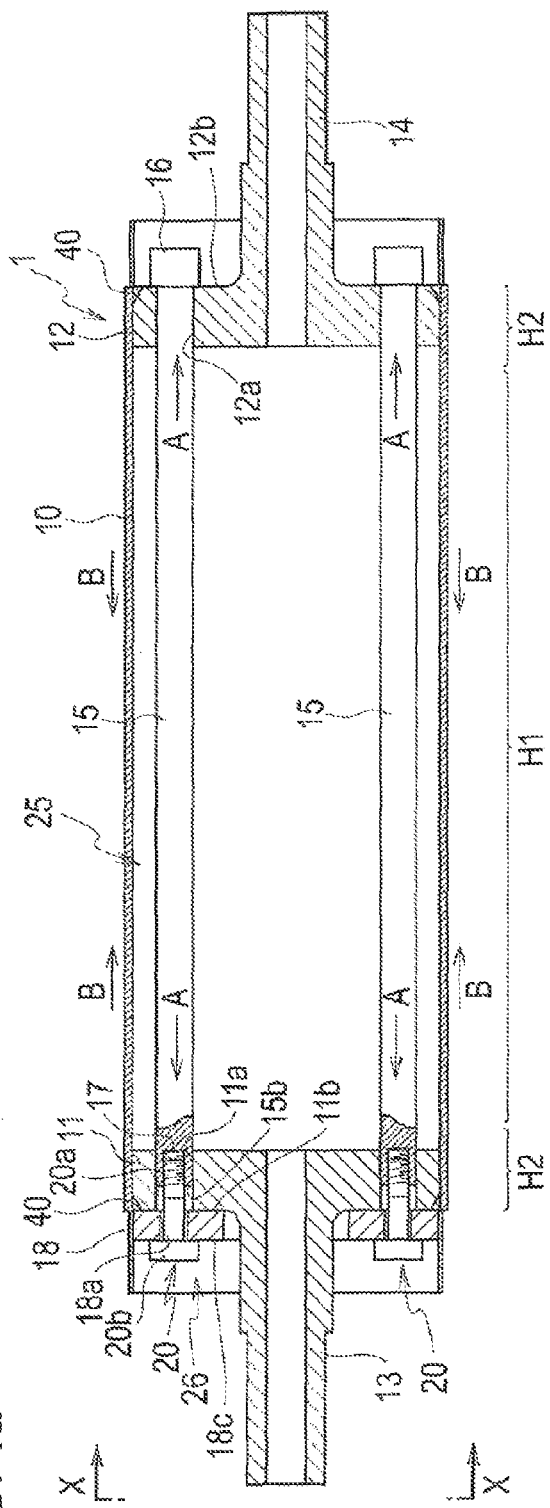
FIGS. 1(a) and 1(b) are configuration diagrams of a holding jig according to a first embodiment of the present invention.
Figure 1B:
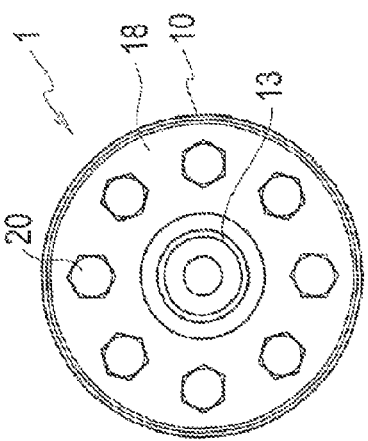

A holding jig 1 shown in FIGS. 1(a) and 1(b) is inserted to an inner periphery of a thin cylindrical work W (see FIG. 2) when machining mainly an outer peripheral surface of the work W so as to hold the work W from an inner peripheral side.

The work W assumed herein is a sleeve (a metallic external cylinder) used in a forming roll for plastic films and the like, for example, which is processed into a product having a thickness of a peripheral wall (a wall thickness) equal to or below 2 mm (or below 2 mm to be more precise), cylindricity equal to or below 50 μm, and maximum roughness Rmax on an outer peripheral surface equal to or below 1 μm. The work W is used in a forming roll of a dual cylinder structure in which the work W serves as an external cylinder, an internal cylinder member is coaxially arranged in an inner peripheral side of the work W, and a space for feeding a heat medium is secured between the internal cylinder member and the external cylinder. The outer peripheral surface of the work W may be provided with a transcriptional pattern such as pearskin-like texture (fine processing at 0.025 mm level, for example) or be subjected to crowning as appropriate.

The holding jig 1 of this embodiment includes a metallic cylinder holding member 10 (a holding member) having a hollow cylindrical shape set up to have a small thickness so as to be able to expand or to contract a diameter slightly and elastically, a right and left pair of circular side plates 11 and 12 having central portions provided with respective shaft portions 13 and 14 protruding coaxially with the metallic cylinder holding member 10 and outer peripheral surfaces fixed to both ends in an axial direction of the metallic cylinder holding member 10 by welding 40 and the like, and a diameter expansion mechanism (a diameter changing unit) 25 provided between the pair of side plates 11 and 12 and configured to expand a diameter of the metallic cylinder holding member 10 by applying an axial external force in a compressing direction to both ends of the metallic cylinder holding member 10 via both of the side plates 11 and 12.

The metallic cylinder holding member 10 is a right cylinder having the thickness of about 1.5% to 8% of a radius thereof, or preferably about 2% to 5% of the radius, and is made of a steel pipe having a wide range of tensile elastic deformation such as STKM16A or S45C.

An outside diameter of the metallic cylinder holding member 10 in the holding jig 1 is set slightly smaller (smaller by an order of several tens of micrometers, for example) than an inside diameter of the work W in a natural state where the axial external force is not applied. Accordingly, it is possible to insert the metallic cylinder holding member 10 to the inner periphery of the work W in the natural state. After being inserted to the inner periphery of the work W, the diameter of the metallic cylinder holding member 10 is expanded by the diameter expansion mechanism 25. Hence the metallic cylinder holding member 10 can have the outer periphery closely contacting an inner peripheral surface of the work W and thus, can hold the work W from inner peripheral side.

The diameter expansion mechanism 25 has a function to apply an axial external force B in a compressing direction to both ends of the metallic cylinder holding member 10 so as to expand the diameter of the metallic cylinder holding member 10. The diameter expansion mechanism 25 includes multiple rods 15 arranged in a circumferential direction at regular intervals around the shaft portions 13 and 14, and screw mechanisms 26 provided for the respective rods 15.

One end portion (a right end portion in FIG. 1(a)) of each of the rods 15 is fitted and inserted to a through hole 12a of the side plate 12 on the right side, and the rod 15 is fixed to the side plate 12 as a head portion 16 thereof on the outside is engaged with the outer side surface 12b.

Another end portion (a left end portion in FIG. 1(a)) of the rod 15 is slidably inserted to a through hole 11a of the side plate 11 on the left side, and is set to have such a length that an end surface 15b thereof stays inside the through hole 11a. A screw hole 17 is provided on the end surface 15b of the other end portion of the rod 15 set up so as to stay inside this through hole 11a.

A bracket plate 18 is fixed to the outer side surface 11b of the side plate 11 on the left side by use of an unillustrated bolt, and a shaft portion of an adjusting screw 20 is inserted to an insertion hole 18a on the bracket plate 18. A screw portion 20a on a tip of the shaft portion of the adjusting screw 20 is screwed into the screw hole 17 on the end surface 15b of the rod 15 while a head portion 20b of the adjusting screw 20 abuts on an outer side surface 18c of the bracket plate 18.

The screw mechanisms 26 include the adjusting screws 20 provided for the respective rods 15, and the screw holes 17 on the rod end surfaces 15b in which the screw portions 20a of the respective adjusting screws 20 are screwed. By applying a tensile force in directions of arrows A to the respective rods 15 by tightening the adjusting screws 20, it is possible to apply the axial external force in the compressing direction indicated with the arrows B to both ends of the metallic cylinder holding member 10 via the side plates 11 and 12 by way of a reactive force thereto.

Figure 2A:
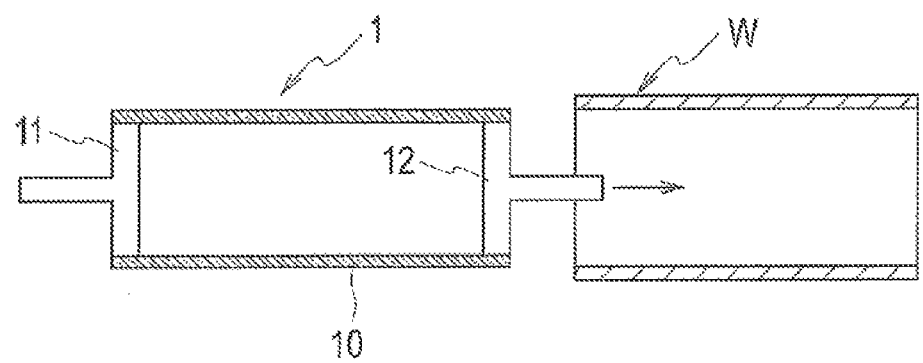
FIGS. 2(a) and 2(b) are simplified diagrams for explaining an operation of the holding jig according to the first embodiment.

Next, procedures for holding the work W with the holding jig 1 will be described by using FIGS. 2(a) and 2(b).

In the holding jig 1, the outside diameter of the metallic cylinder holding member 10 is formed slightly smaller than the inside diameter of the work W in the natural state the axial external force is not applied. Accordingly, as shown in FIG. 2(a), it is possible to insert the metallic cylinder holding member 10 to the inner periphery of the work W while maintaining the natural state.

Figure 2B:
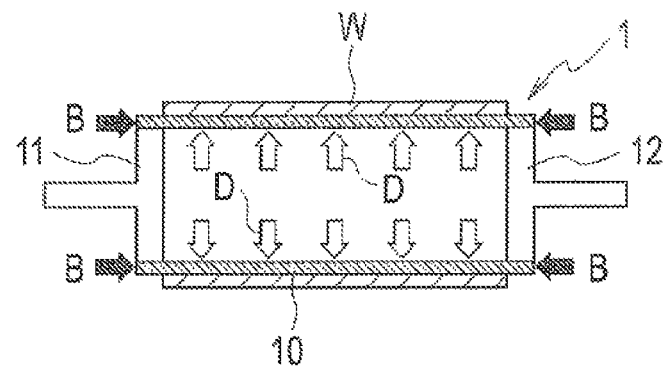

Then, at a stage where the metallic cylinder holding member 10 is inserted to the inner periphery of the work W, the diameter of the metallic cylinder holding member 10 is expanded as indicated with arrows D by causing the diameter expansion mechanism 25 provided as the diameter changing unit to apply the axial external force (the external force indicated with the arrows B) in the compressing direction to both ends of the metallic cylinder holding member 10 as shown in FIG. 2(b). In this way, it is possible to cause the outer peripheral surface of the metallic cylinder holding member to closely and firmly contact the inner peripheral surface of the work W and thereby to hold the work W.

In this case, the outer peripheral surface of the metallic cylinder holding member 10 holds the work W while closely contacting substantially the entire inner peripheral surface of the work W. Accordingly, it is possible to support the work W entirely as a whole from the inner peripheral surface side, and thereby to exert a strong holding force to withstand a processing pressure. Moreover, the work is hardly deformed when receiving a strong processing force locally unlike the case of holding the work by using a conventional elastic body made of a rubber or the like. For this reason, by holding the work W as described above and rotating the work W while supporting the shaft portions 13 and 14 provided in the protruding matter on the respective side plates 11 and 12, it is possible to subject the outer peripheral surface of the work W to machining (such as cutting the outer periphery, grinding the outer periphery or pattern forming) at high accuracy, and to improve cylindricity and surface roughness of the work W.

After the machining, it is possible to restore the original diameter of the metallic cylinder holding member 10 in the natural state (to contract the diameter to the original state) by loosening the adjusting screws 20, whereby the holding jig 1 can be detached from the work W.

As described above, it is possible to perform attachment and detachment reliably and easily because the diameter of the metallic cylinder holding member 10 can be expanded and contracted by performing the tightening operation and the loosening operation of the adjusting screws 20.

(Second Embodiment)

Figure 3A:
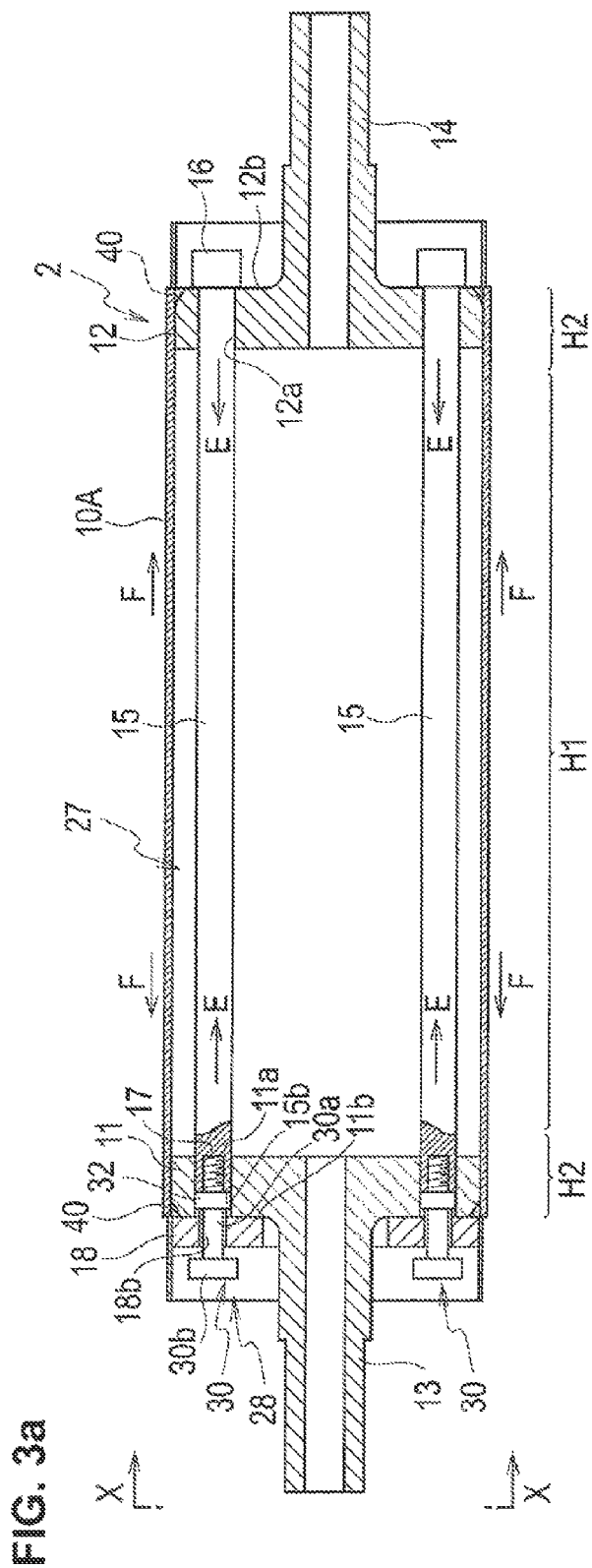
FIGS. 3(a) and 3(b) are configuration diagrams of a holding jig according to a second embodiment of the present invention.
Figure 3B:
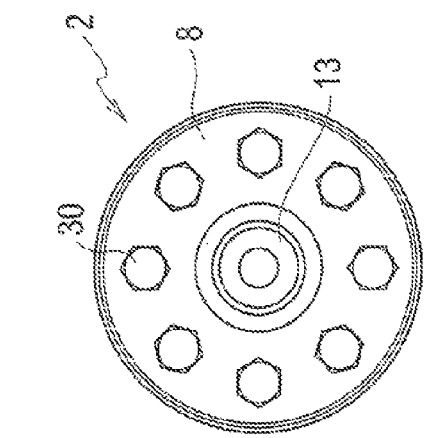

As similar to the first embodiment, a holding jig 2 shown in FIGS. 3(a) and 3(b) is also inserted to an inner periphery of a thin cylindrical work W (see FIG. 4) when machining mainly an outer peripheral surface of the work W so as to hold the work W from an inner peripheral side.

The holding jig 2 includes a metallic cylinder holding member 10A (a holding member) having a hollow cylindrical shape set up to have a small thickness so as to be able to expand or to contract a diameter slightly and elastically, the right and left pair of circular side plates 11 and 12 having central portions provided with the respective shaft portions 13 and 14 protruding coaxially with the metallic cylinder holding member 10A and the outer peripheral surfaces fixed to both ends in the axial direction of the metallic cylinder holding member 10A, and a diameter contraction mechanism (a diameter changing unit) 27 provided between the pair of side plates 11 and 12 and configured to contract the diameter of the metallic cylinder holding member 10A by applying an axial external force in a tensile direction to both ends of the metallic cylinder holding member 10A via both of the side plates 11 and 12.

The metallic cylinder holding member 10A is a right cylinder having the thickness of about 1.5% to 8% of a radius thereof, and preferably about 2% to 5% of the radius, and is made of a steel pipe having a wide range of tensile elastic deformation such as STKM16A or S45C.

An outside diameter of the metallic cylinder holding member 10A in the holding jig 2 is set slightly larger (larger by an order of several tens of micrometers, for example) than the inside diameter of the work W in the natural state where the axial external force is not applied. Accordingly, the metallic cylinder holding member 10A cannot be inserted to the inner periphery of the work W in the natural state. However, it is possible to insert the metallic cylinder holding member 10A to the inner periphery of the work W by contracting the diameter of the metallic cylinder holding member 10A by using the diameter contraction mechanism 27.

The metallic cylinder holding member 10A is temporarily contracted in diameter to be inserted to the inner periphery of the work W and then restores the original diameter (to expand the diameter) by releasing the contraction. In this way, the metallic cylinder holding member 10A can have the outer periphery closely contacting the inner peripheral surface of the work W and thus can hold the work W from the inner peripheral side.

The diameter contraction mechanism 27 has a function to apply an axial external force F in the tensile direction to both ends of the metallic cylinder holding member 10A so as to contract the diameter of the metallic cylinder holding member 10A. The diameter contraction mechanism 27 includes the multiple rods 15 arranged in the circumferential direction at regular intervals around the shaft portions 13 and 14, and the screw mechanisms 28 provided for the respective rods 15.

One end portion (a right end portion in FIG. 3(a)) of each of the rods 15 is fitted and inserted to the through hole 12a of the side plate 12 on the right side, and the rod 15 is fixed to the side plate 12 as the head portion 16 thereof on the outside is engaged with the outer side surface 12b. Another end portion (a left end portion in FIG. 3(a)) of the rod 15 is slidably inserted to the through hole 11a of the side plate 11 on the left side, and the rod 15 is set to have such a length that the end surface 15b thereof stays inside the through hole 11a. The one end portion (the right end portion in FIG. 3(a)) of the rod 15 may be configured and set up similarly to the other end portion (the left end portion in FIG. 3(a)) of the rod 15.

The rod 15 includes the screw hole 17 on the end surface 15b so as to be formed in common to the holding jig 1 of the first embodiment. However, the screw hole 17 is not used in this embodiment. Instead, a spacer 32 is disposed on the end surface 15b on the other end portion of the rod 15. The spacer 32 has a function to avoid a screw shaft portion 30a of an adjusting screw 30 to be described later from entering the screw hole 17 and thereby to surely transmit a pressure from a tip end of the adjusting screw 30 to the rod 15.

The bracket plate 18 is fixed to the outer side surface 11b of the side plate 11 on the left side by use of an unillustrated bolt. Instead of the insertion hole 18a of the first embodiment, a screw hole 18b is formed on the bracket plate 18 and the screw shaft portion 30a extending from a bottom of a head portion 30b of the adjusting screw 30 is screwed therein. Accordingly, it is possible to apply the pressure to the end surface 15b of the rod 15 via the spacer 32 by tightening the adjusting screw 30.

The screw mechanisms 27 include the adjusting screws 30 provided for the respective rods 15, and the screw holes 18b on the bracket plates 18 in which the screw portions 30a of the respective adjusting screws 30 are screwed. By applying the pressure in directions of arrows E to the respective rods 15 by tightening the adjusting screws 30, it is possible to apply the axial external force in the tensile direction indicated with the arrows F to both ends of the metallic cylinder holding member 10A via the side plates 11 and 12 by way of a reactive force thereto.

Figure 4A:
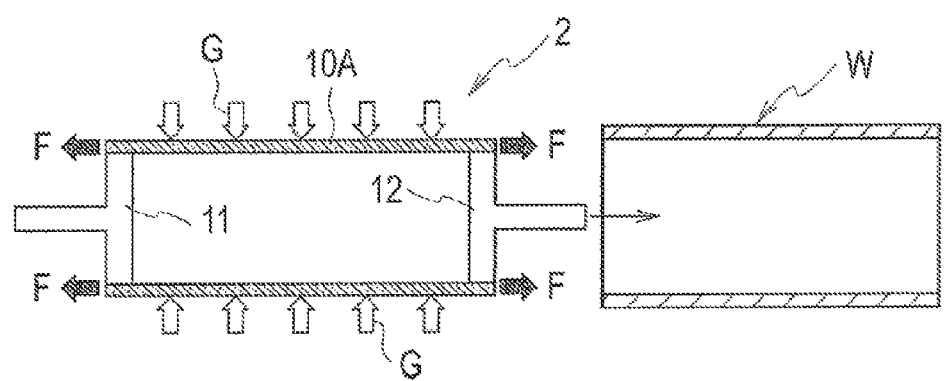
FIGS. 4(a) and 4(b) are simplified diagrams for explaining an operation of the holding jig according to the second embodiment.
Figure 4B:
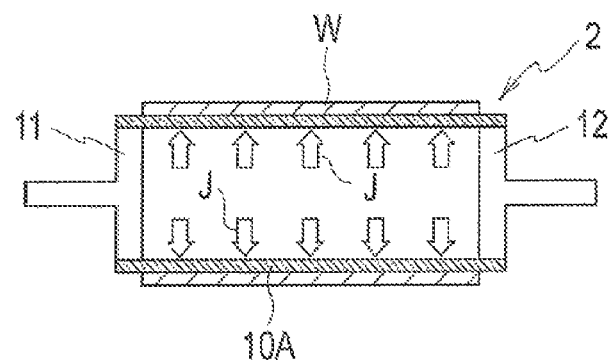

Next, procedures for holding the work W with the holding jig 2 will be described by using FIGS. 4(a) and 4(b).

In the holding jig 2, the outside diameter of the metallic cylinder holding member 10A is formed slightly larger than the inside diameter of the work W in the natural state where the axial external force is not applied. Accordingly, prior to insertion, the axial external force F in the tensile direction is applied to both ends of the metallic cylinder holding member 10A by use of the diameter contraction mechanism 27 provided as the diameter changing unit so as to contract the diameter of the metallic cylinder holding member 10 as indicated with arrows G. Then, the metallic cylinder holding member 10A in this state of the contracted diameter is inserted to the inner periphery of the work W. Next, at an inserted stage, the axial external force (the tensile force F) applied from the diameter contraction mechanism 27 is released. Accordingly, it is possible to restore (expand) the diameter of the metallic cylinder holding member 10 to the diameter in the free state. In this way, the outer peripheral surface of the metallic cylinder holding member 10A can closely contact the inner peripheral surface of the work W and thus the work W can be held.

In this case, the outer peripheral surface of the metallic cylinder holding member 10A holds the work W while closely contacting substantially the entire inner peripheral surface of the work W. Accordingly, it is possible to support the work W entirely as a whole from the inner peripheral surface side, and thereby to exert a strong holding force to withstand a processing pressure. Moreover, the work is hardly deformed when receiving a strong processing force locally unlike the case of holding the work by using a conventional elastic body made of a rubber or the like. For this reason, by holding the work W as described above and rotating the work W while supporting the shaft portions 13 and 14 protruding from the respective side plates 11 and 12, it is possible to subject the outer peripheral surface of the work W to machining (such as cutting the outer periphery, grinding the outer periphery or pattern forming) at high accuracy, and to improve cylindricity and surface roughness of the work W.

After machining, the diameter of the metallic cylinder holding member 10A is contracted by tightening the adjusting screws 30 again. In this way, the holding jig 2 can be detached from the work W.

As described above, it is possible to perform attachment and detachment reliably and easily because the diameter of the metallic cylinder holding member 10A can be expanded and contracted by performing the tightening operation and the loosening operation of the adjusting screws 30.

(Third Embodiment)

A holding jig 3 according to a third embodiment includes both of the diameter contraction mechanism 27 and the diameter expansion mechanism 25 described above. An outside diameter of a metallic cylinder holding member 10B (a holding member) is set to a slightly different diameter from the inside diameter of the work in the natural state where the axial external force is not applied. The outside diameter may be set to a similar diameter to that in the second embodiment.

Figure 5A:
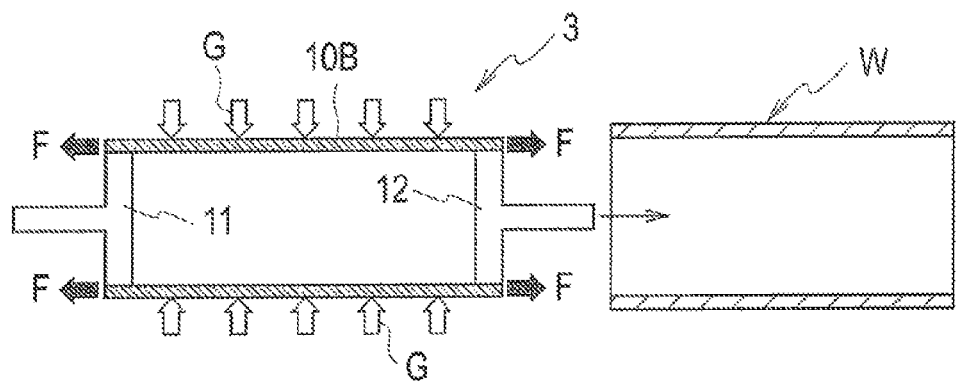
FIGS. 5(a) and 5(b) are simplified diagrams for explaining an operation of a holding jig according to a third embodiment.
Figure 5B:
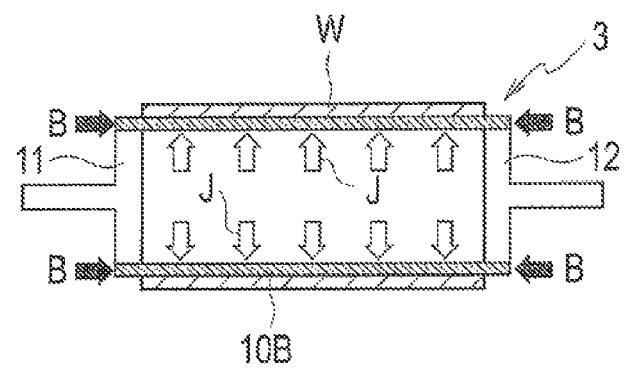

Accordingly, as shown in FIG. 5(a), the metallic cylinder holding member 10B is inserted to the inner periphery of the work W by applying the axial external force F in the tensile direction to both ends of the metallic cylinder holding member 10B prior to insertion to the work W by use of the diameter contraction mechanism 27 provided as the diameter changing unit to contract the diameter of the metallic cylinder holding member 10B as indicated with the arrows G. Then, as shown in FIG. 5(b), at an inserted stage, the axial external force (the tensile force) applied from the diameter contraction mechanism 27 is released and the axial external force B in the compressing direction is applied to both ends of the metallic cylinder holding member 10B by use of the diameter expansion mechanism 25 provided as the diameter changing unit to expand the diameter of the metallic cylinder holding member 10B as indicated with arrows J. Hence the outer peripheral surface of the metallic cylinder holding member 10B is caused to closely contact the work W and thus the work W is held.

In this case, it is possible to perform insertion easily because the diameter of the metallic cylinder holding member 10B is contracted at the time of insertion to the work W. Meanwhile, it is possible to cause the metallic cylinder holding body 10B to exert a powerful holding force because the diameter thereof is expanded after insertion.

Figure 6A:
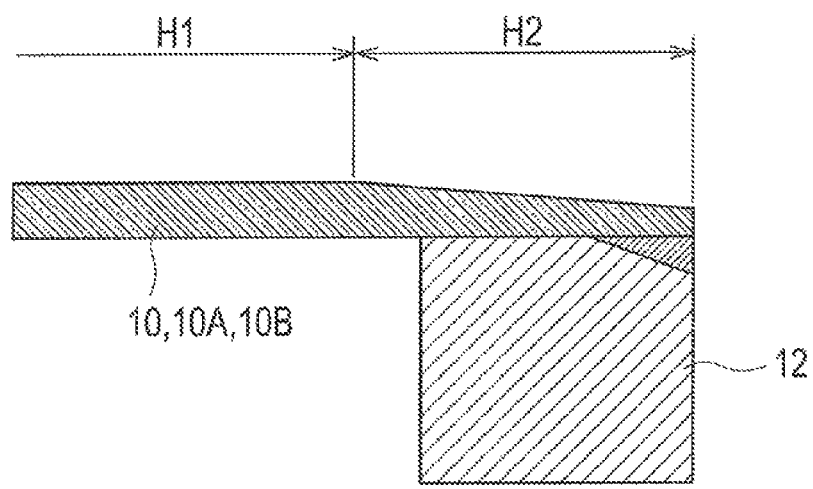
FIGS. 6(a) and 6(b) are views showing examples of shapes of an end portion of each of the metallic cylinder holding members according to the first to third embodiments of the present invention.
Figure 6B:
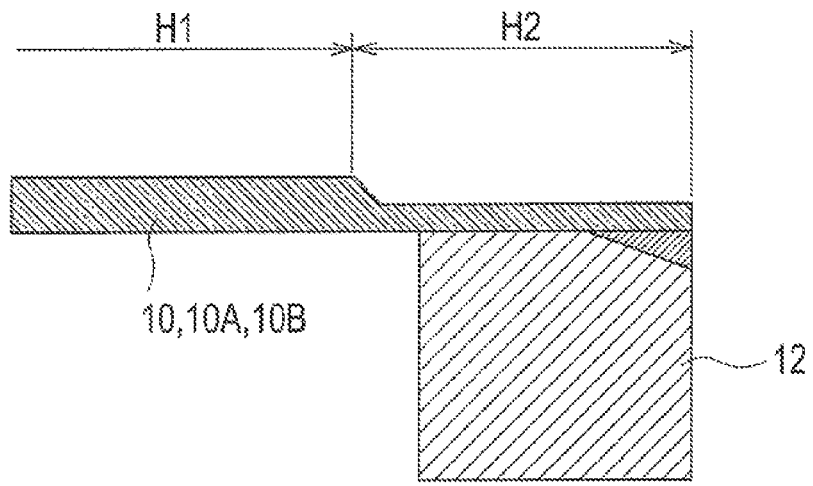

Next, examples of shapes of the end portions of the metallic cylinder holding members 10, 10A, and 10B according to the first to third embodiments of the present invention will be described. As shown in FIG. 1(a) and FIG. 3(a) (not illustrated for the third embodiment), a work holding region H1 for holding the work W is provided at an intermediate portion in the axial direction of the metallic cylinder holding member 10, 10A or 10B so as to cover the length in the axial direction of the work W. To be more precise, the length in the axial direction of the work holding region H1 of the metallic cylinder holding portion 10, 10A or 10B is longer than the length in the axial direction of the work W. Both ends of the metallic cylinder holding portion 10, 10A or 10B are bound by the side plates 11 and 12 and thus diameter change such as diameter expansion or diameter contraction does not occur thereat. Accordingly, as shown in FIG. 6(a) or 6(b), at least one of two outside regions H2 of the work holding region H1 in any of the first to third embodiments is formed into a tapered shape as shown in FIG. 6(a) or a stepped shape as shown in FIG. 6(b) so as to have a smaller diameter than that of the work holding region H1. Moreover, the side plate 12 is fixed to an end portion of any of two outside regions H having the diameter smaller than that of the work holding region H1. In this way, it is possible to insert and detach the metallic cylinder holding member 10, 10A or 10B to and from the work W easily.

Here, the relation between the length in the axial direction of the metallic cylinder holding members 10, 10A or 10B with the length in the axial direction of the work W will be described further. Specifically, the length in the axial direction of the metallic cylinder holding members 10, 10A or 10B only needs to be longer than the length in the axial direction of the actual processing region of the work W. As long as this condition is satisfied, the length in the axial direction of the work W may be set longer than the length in the axial direction of the work holding region H1. In this case, the length in the axial direction of the work W is assumed to be shorter than the length of the metallic cylinder holding members 10, 10A, and 10B (H1+H2×2), and the actual processing region of the work W is assumed to be present at an intermediate portion of the work W in the axial direction of the work W.

Figure 7A:
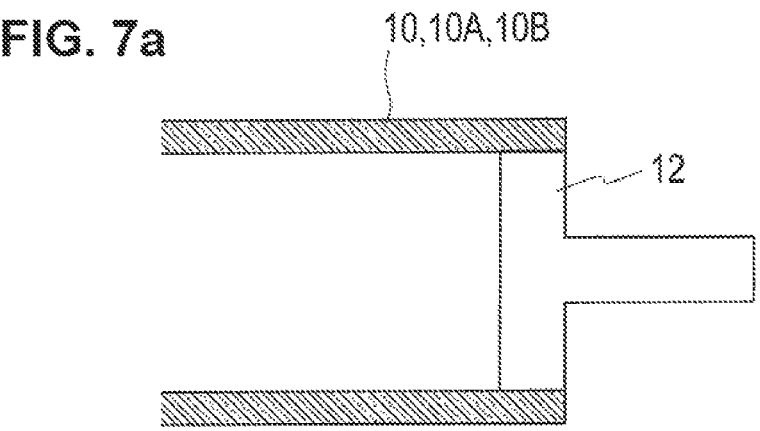
FIGS. 7(a) to 7(c) are views showing variations of a fixation structure between the end portion of the metallic cylinder holding member and a side plate in the holding jig according to any of the first to third embodiments of the present invention.
Figure 7B:
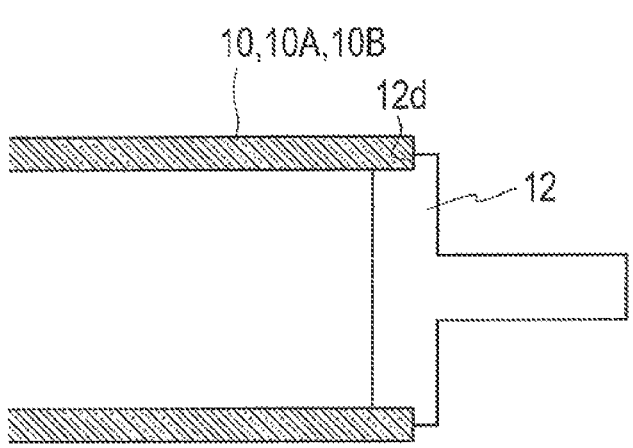
Figure 7C:
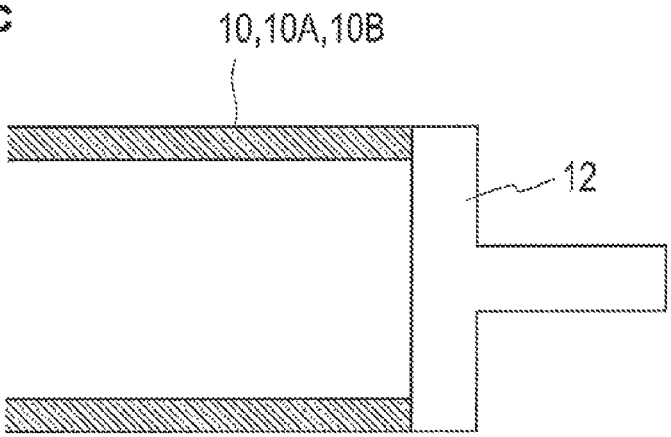

A fixation structure between the end portion of any of the metallic cylinder holding members 10, 10A, and 10B in the jigs 1 to 3 and the side plate 12 according to the first to third embodiments of the present invention will be described. As for the structure of a fixing portion between the metallic cylinder holding member 10, 10A or 10B and the side plate 12, variations as shown in FIG. 7 can be employed. FIG. 7(a) shows an example of establishing fixation by simply engaging an outer periphery of the side plate 12 with an inner periphery of the end portion of the metallic cylinder holding member 10, 10A or 10B. FIG. 7(b) shows an example of establishing fixation by forming a stepped portion 12d on an outer peripheral portion of the side plate 12 and engaging the stepped portion 12 with the end portion of the metallic cylinder holding member 10, 10A or 10B. FIG. 7(c) shows an example of establishing fixation by simply causing a side surface of the side plate 12 and an end surface of the metallic cylinder holding member 10, 10A or 10B to abut each other. The same applies to the side plate 11 on the opposite side.

As described previously, the thin cylindrical work W may be used in a sheet film forming roll.

Specifically, the thin cylindrical work W processed in accordance with the above-described processing method may be used in the sheet film forming roll. As disclosed in Japanese Unexamined Patent Application Publication No. 2007-83577, for example, the sheet film forming roll is a device configured to form a sheet or a film by winding the sheet or the film around an outer periphery of an external cylinder of a cylindrical shape.

The thin cylindrical work W serving as the external cylinder has a thickness of a peripheral wall in a range from 0.5 mm to 2 mm (e.g., excluding 2 mm) for example, and has maximum surface roughness Rmax of the outer peripheral surface equal to or below 1 µm. Meanwhile, an internal cylinder sharing the central axis with the external cylinder is disposed inside the external cylinder so as to allow a continuous flow of a heat medium (such as a coolant for cooling the sheet or the film being wound around the external cylinder and moving along rotation of the external cylinder), for example.

Further, the thin cylindrical work W may also be subjected to crowning. Specifically, the thin cylindrical work W serving as the external cylinder may be formed into a barrel shape with the outside diameter being small at the end portions in the axial direction and gradually and very slightly increasing toward the central portion in the axial direction.

Meanwhile, a transcriptional pattern formed of fine irregularities (such as a fine transcriptional pattern having the pitch and level almost as small as a wavelength of visible light) may be formed on the outer peripheral surface of the thin cylindrical work W serving as the external cylinder. In this way, the fine pattern is transcribed onto one of surfaces in a thickness direction of the sheet or the film.

Meanwhile, a pearskin-like texture transcriptional pattern may be formed on the outer peripheral surface of the thin cylindrical work W. In this way, one of surfaces in the thickness direction of the sheet or the film is formed into a pearskin-like texture surface.

The invention claimed is:

1. A method of manufacturing a sheet film forming roll comprising:
   processing a thin cylindrical work used as an external cylinder of the sheet film forming roll, by a method including holding the thin cylindrical work using a holding jig for the thin cylindrical work and machining an outer peripheral surface of the thin cylindrical work being held, the holding jig including:
      a holding member made of a metal and having a cylindrical shape and an elastically expandable or contractible diameter, the holding member configured with an outside diameter of the holding member being held smaller than an inside diameter of the thin cylindrical work for insertion of the holding member into an inner periphery of the thin cylindrical work and being expanded after insertion of the holding member into the inner periphery of the thin cylindrical work to hold the thin cylindrical work from an inner peripheral side of the thin cylindrical work with an outer peripheral surface of the holding member in close contact with an entire inner peripheral surface of the thin cylindrical work;
      a diameter changing unit configured to apply either:
         an axial external force in a compressing direction to both ends of the holding member to change the diameter of the holding member,
         an axial external force in a tensile direction to both ends of the holding member to change the diameter of the holding member, or
         an axial external force in a tensile direction and then an axial external force in a compressing direction to both ends of the holding member to change the diameter of the holding member; and
      a pair of circular side plates each including outer peripheral portion fixed to an opposite end of the holding member respectively;
      wherein the diameter changing unit is provided between the pair of circular side plate, and wherein the diameter changing unit includes:
         a plurality of rods provided between the pair of circular side plates; and
         a screw mechanism configured to apply either a tensile force or a compressing force to each of the rods by rotation of a screw in order to apply either the axial external force in the compressing direction or the axial external force in the tensile direction to the both ends of the holding member via the circular side plates via a reactive force of the tensile force or the compressing force.

2. The method according to claim 1, wherein:
   the holding jig further includes an internal cylinder located inside the external cylinder and sharing a central axis with the external cylinder,
   a heat medium flows between the external cylinder and the inner cylinder, and
   the thin cylindrical work used as the external cylinder is processed to comprise:
      a peripheral wall having a thickness of 0.5 to 2 mm, and
      an outer peripheral surface having a maximum surface roughness equal to or below 1 µm.

3. The method according to claim 2, wherein the thin cylindrical work used as the external cylinder is subjected to crowning.

4. The method according to claim 1, wherein the thin cylindrical work used as the external cylinder is subjected to crowning.

5. The method according to claim 1, wherein:
   the holding jig further includes an internal cylinder located inside the external cylinder and sharing a central axis with the external cylinder,
   a heat medium flows between the external cylinder and the inner cylinder, and
   the thin cylindrical work used as the external cylinder is processed to comprise:
      a peripheral wall having a thickness of 0.5 to 2 mm, and
      an outer peripheral surface with a transcriptional pattern including fine irregularities.

6. The method according to claim 1, wherein:
   the holding jig further includes an internal cylinder located inside the external cylinder and sharing a central axis with the external cylinder,
   a heat medium flows between the external cylinder and the inner cylinder, and
   the thin cylindrical work used as the external cylinder is processed to comprise:
      a peripheral wall having a thickness of 0.5 to 2 mm, and
      an outer peripheral surface with a pearskin-like transcriptional pattern.

* * * * *